(12) United States Patent
Lee et al.

(10) Patent No.: US 11,117,202 B2
(45) Date of Patent: Sep. 14, 2021

(54) HIGH-FEED CUTTING INSERT AND CUTTING TOOL EQUIPPED WITH SAME

(71) Applicant: KORLOY INC., Seoul (KR)

(72) Inventors: Sang Yong Lee, Cheongju-si (KR); Young Nam Choi, Cheongju-si (KR); Jae Man Park, Cheongju-si (KR)

(73) Assignee: KORLOY INC., Seoul (KR)

(\*) Notice: Subject to any disclaimer, the term of this patent is extended or adjusted under 35 U.S.C. 154(b) by 151 days.

(21) Appl. No.: 16/497,838

(22) PCT Filed: Mar. 13, 2018

(86) PCT No.: PCT/KR2018/002916
§ 371 (c)(1),
(2) Date: Sep. 26, 2019

(87) PCT Pub. No.: WO2018/190521
PCT Pub. Date: Oct. 18, 2018

(65) Prior Publication Data
US 2020/0023446 A1   Jan. 23, 2020

(30) Foreign Application Priority Data
Apr. 11, 2017  (KR) .................. 10-2017-0046900

(51) Int. Cl.
*B23C 5/06*       (2006.01)
*B23C 5/20*       (2006.01)

(52) U.S. Cl.
CPC ............... *B23C 5/207* (2013.01); *B23C 5/06* (2013.01); *B23C 2200/0472* (2013.01);
(Continued)

(58) Field of Classification Search
CPC .... B23C 2200/0455; B23C 2200/0494; B23C 2200/203; B23C 2200/367;
(Continued)

(56) References Cited

U.S. PATENT DOCUMENTS 4,124,326 A * 11/1978 Cost ..................... B23B 27/141
407/114
5,639,189 A * 6/1997 Hoefler ..................... B23C 3/04
407/113
(Continued)

FOREIGN PATENT DOCUMENTS

EP          2214857 B1    10/2011
JP      2017056552 A      3/2017
(Continued)

*Primary Examiner* — Nicole N Ramos
(74) *Attorney, Agent, or Firm* — Rabin & Berdo, P.C.

(57) ABSTRACT

The present disclosure's technical object is to provide a high feed cutting insert capable of providing a sufficient entering angle while ensuring rigidity of a cutting tool's bottom part. For this, the high feed cutting insert of the present disclosure comprises a short cutting edge provided on a boundary portion between a main surface and a short side surface, a long cutting edge provided on a boundary portion between the main surface and a long side surface, two ascending corner cutting edges connecting the short cutting edge and the long cutting edge, and placed on one diagonal position, and two descending corner cutting edges placed on the other diagonal position and having the height lower than that of the ascending corner cutting edges, wherein the short cutting edge and the long cutting edge, when viewed towards the main surface, form an obtuse angle while the ascending corner cutting edges are interposed therebetween and form an acute angle while the descending corner cutting edges are interposed therebetween.

13 Claims, 16 Drawing Sheets

(52) U.S. Cl.
CPC .... *B23C 2200/20* (2013.01); *B23C 2200/286* (2013.01); *B23C 2210/168* (2013.01)

(58) Field of Classification Search
CPC ...... B23C 2210/0042; B23C 2210/168; B23C 5/06; B23C 5/20; B23C 5/207
See application file for complete search history.

(56) References Cited

U.S. PATENT DOCUMENTS

| | | | | |
|---|---|---|---|---|
| 8,696,257 B2* | 4/2014 | Saito | ................ | B23C 5/2213 407/42 |
| 2005/0063792 A1* | 3/2005 | Satran | ................ | B23C 5/1072 407/113 |
| 2005/0169716 A1* | 8/2005 | Smilovici | ................ | B23C 5/2221 407/113 |
| 2005/0214081 A1* | 9/2005 | Satran | ................ | B23C 5/06 407/113 |
| 2007/0104546 A1* | 5/2007 | Maeta | ................ | B23C 5/202 407/113 |
| 2009/0136304 A1* | 5/2009 | Satran | ................ | B23C 5/207 407/104 |
| 2011/0129309 A1* | 6/2011 | Kovac | ................ | B23C 5/06 407/42 |
| 2014/0161544 A1* | 6/2014 | Morandeau, Sr. | ...... | B23C 5/006 407/40 |
| 2017/0014920 A1* | 1/2017 | Fang | ................ | B23C 5/2221 |
| 2017/0157684 A1* | 6/2017 | Nam | ................ | B23C 5/20 |
| 2017/0297120 A1* | 10/2017 | Fang | ................ | B23C 5/2221 |
| 2018/0333791 A1* | 11/2018 | Lee | ................ | B23C 5/207 |

FOREIGN PATENT DOCUMENTS

| | | | | |
|---|---|---|---|---|
| KR | 1020050115643 A | 12/2005 | | |
| KR | 1020110050633 A | 5/2011 | | |
| KR | 1020110135928 A | 12/2011 | | |
| WO | WO-2016006812 A1 * | 1/2016 | ............ | B23C 5/207 |

* cited by examiner

HIGH-FEED CUTTING INSERT AND CUTTING TOOL EQUIPPED WITH SAME

TECHNICAL FIELD

The present disclosure relates to a high feed cutting insert having a high machining speed and a cutting tool equipped with the same.

BACKGROUND ART

Generally, a cutting insert is fastened to a cutting tool mounted on a machine tool and is used for machining a workpiece made of iron, non-ferrous metal, non-metal material, and the like.

FIG. 14 is a perspective view showing a conventional tangential cutting insert, FIG. 15 is a view schematically showing a state in which the tangential cutting insert of FIG. 14 is mounted to a cutting tool, and FIG. 16 is a bottom view showing the radial rake angle of the cutting insert of FIG. 14 when mounted to the cutting tool.

An example of the conventional tangential cutting insert 10 is disclosed in EP02214857 A1, which includes, as shown in FIG. 14, an upper surface 12, a lower surface 14, two side surfaces 24 connecting between the upper surface and the lower surface, a front surface 20 connecting between the two side surfaces, a main cutting edge 32 formed between the front surface 20 and the upper surface 12, a sub-cutting edge 34 formed between the front surface 20 and the side surface 24, a fastening hole 18 into which a cutting tool fastening bolt (not shown) extending through the upper surface 12 and the lower surface 14 is inserted. In this example, the main cutting edge 32 has a substantially V shape with two inclined straight lines extending in the middle when viewed towards the upper surface 12, the sub-cutting edge 34 has a shape of a straight line when viewed towards the side surface 24, and a corner cutting edge 36 is placed between the main cutting edge 32 and the sub-cutting edge 34.

However, since the conventional tangential cutting insert 10 has the front surface 20 that is in rectangular shape, as shown in FIG. 15, in order to provide the entering angle θ1 and the back taper θ2 when mounted on the cutting tool 50, the cutting insert 10 has to be mounted at excessive angles with respect to the cutting tool 50 such that the screw fastening hole 51 formed in the cutting tool 50 is placed close to the bottom surface 52 of the cutting tool 50, resulting in a problem of lowered rigidity of the bottom part of the cutting tool 50. For reference, when the cutting insert 10 is mounted to the cutting tool 50, it is necessary to provide an entering angle θ1 for high feed machining. However, if the entering angle θ1 is decreased, this leads into generation of large radial force and subsequently increased vibrations during machining, thus resulting in a problem of breakdown of the cutting insert 10. Therefore, in order to prevent such breakdown, the entering angle θ1 of approximately 5 to 15 degrees is adapted.

In addition, since the conventional tangential cutting insert 10 includes the main cutting edge 32 and the sub-cutting edge 34 having a straight line shape, this results in problems of lower cutting edge strength and larger contact load with the workpiece, thus preventing it from being used for high feed machining.

In addition, according to the conventional tangential cutting insert 10, the sub-cutting edge 34 in contact with the bottom surface of the workpiece is perpendicular to each of the upper surface 12 and the lower surface 14, and accordingly, as shown in FIG. 16, when the cutting insert 10 is mounted to the cutting tool 50, the radial rake angle θ3 of the cutting insert 10 will be the negative radial rake angle as this is inclined from the radial straight line RL to the negative direction which is the cutting direction of the cutting tool 20, and as a result, there is a problem that the cutting insert 10 is subjected to increased cutting load applied thereto during machining of the bottom surface of the workpiece, and vibration is generated, causing uneven cut surface of the workpiece. Typically, the problem becomes severer as the radial rake angle of the cutting insert 10 is inclined further towards the negative direction.

DISCLOSURE

Technical Problem

The technical problem of the present disclosure is to provide a high feed cutting insert capable of providing a sufficient entering angle while ensuring rigidity of the bottom part of the cutting tool, and a cutting tool equipped with the same.

Another technical objective of the present disclosure is to provide a high feed cutting insert capable of increasing the edge strength suitable for high feed machining and also reducing the cutting load, and a cutting tool equipped with the same.

Yet another technical problem of the present disclosure is to provide a high feed cutting insert capable of reducing the cutting load applied to the cutting edge of the cutting insert and minimizing the occurrence of vibration during machining of the bottom surface of the workpiece by minimizing inclining of the radial rake angle towards the negative direction, and a cutting tool equipped with the same.

Technical Solution

According to an aspect of the present disclosure, there is provided a high feed cutting insert, which may include a main surface and a sub-surface facing each other in opposite directions, two short side surfaces connecting the main surface and the sub-surface and facing each other in opposite directions, two long side surfaces connecting the main surface and the sub-surface, connecting the two short side surfaces, facing each other in opposite directions, and having a greater width than that of the short side surfaces, and a fastening hole extending through the two long side surfaces, through which a cutting tool fastening bolt is inserted, in which the high feed cutting insert may include short cutting edges provided on boundary portions between the main surface and the short side surfaces, long cutting edges provided on boundary portions between the main surface and the long side surfaces, two ascending corner cutting edges connecting the short cutting edges and the long cutting edges, and placed on one diagonal position, and two descending corner cutting edges placed on the other diagonal position and having a lower height than that of the ascending corner cutting edges, in which the short cutting edge and the long cutting edge, when viewed towards the main surface, form an obtuse angle while the ascending corner cutting edges are interposed therebetween and form an acute angle while the descending corner cutting edges are interposed therebetween.

The short cutting edges may have a curved, outwardly convex shape when viewed towards the main surface.

The short cutting edges may have a downwardly-inclined shape from the ascending corner cutting edges to the descending corner cutting edges, when viewed towards the short side surfaces.

The short cutting edges may have a curved, outwardly convex shape when viewed towards the short side surfaces.

When viewed towards the long side surfaces, the long cutting edges may include concave sections that are inwardly concave; and straight line section connecting the concave sections.

When viewed towards the long side surfaces, the concave sections may start at the ascending corner cutting edges and end at the straight line sections, and the straight sections may start at the concave sections and end at the descending corner cutting edges and may have a downwardly-inclined shape towards the descending corner cutting edges.

When viewed towards the long side surfaces, the ascending corner cutting edges may have an outwardly convex shape, and the descending corner cutting edges may have an inwardly concave shape.

The short side surfaces may include first clearance surfaces adjacent to the short cutting edges; and second clearance surfaces connecting the first clearance surfaces and the sub-surface, in which the first clearance surfaces may form a right angle with respect to the main surface, and the second clearance surfaces may form an acute angle with respect to the main surface and form an obtuse angle with respect to the sub-surface and may have a generally planar shape.

When viewed from the short lateral surfaces, a portion of the first clearance surfaces adjacent to the ascending corner cutting edges may be connected to the sub-surface.

As an example, the main surface may be rotationally symmetrical by 180 degrees with respect to a center thereof, and the sub-surface may have a straight line shape when viewed towards each of the short side surfaces and the long side surfaces.

As another example, each of the main surface and the sub-surface may be rotationally symmetrical by 180 degrees with respect to a center thereof, each of the short side surfaces may be rotationally symmetrical by 180 degrees with respect to a center thereof, and each of the long side surfaces may be rotationally symmetrical by 180 degrees with respect to a center thereof.

As yet another example, each of the main surface and the sub-surface may be rotationally symmetrical by 180 degrees with respect to a center thereof, each of the short side surfaces may be laterally symmetrical with respect to a center line that runs across the long side surfaces on the upper and lower sides, and each of the long side surfaces may be laterally symmetrical with respect to a center line that runs across the short side surfaces on the upper and lower sides.

Meanwhile, a cutting tool according to an embodiment is a type of cutting tool equipped with the high feed cutting insert according to the embodiment described above, which may include a first seat surface on which the sub-surface is placed; a second seat surface on which the short side surfaces are placed; and a third seat surface on which the long side surfaces are placed, in which the third seat surface may be inclined in a direction further away from a center of the cutting tool towards a bottom of the cutting tool.

Advantageous Effects

As described above, the high feed cutting insert and the cutting tool equipped with the same according to embodiments of the present disclosure have the following effects.

According to an embodiment of the present disclosure, there is provided a technical configuration which includes a short cutting edge, a long cutting edge, an ascending corner cutting edge, and a descending corner cutting edge, in which, the short cutting edge and the long cutting edge, when viewed towards the main surface, form an obtuse angle with respect to the ascending corner cutting edge interposed therebetween and form an acute angle while the descending corner cutting edges are interposed therebetween. Accordingly, the entering angle of an approximate 5 to 15 degrees can be provided through the obtuse angle, without requiring the cutting insert be inclined at an excessive angle with respect to the cutting tool in order to provide the entering angle and back taper when mounted to the cutting tool, and accordingly, it is possible to provide a sufficient entering angle while ensuring rigidity of the bottom part of a cutting tool. In other words, since a screw fastening hole formed in the cutting tool can be formed at a sufficient distance from the bottom surface of the cutting tool, while a sufficient entering angle can still be provided, it is possible to ensure the rigidity of the bottom part of the cutting tool.

Further, according to the embodiment of the present disclosure, a technical configuration is provided, in which the short cutting edge has a curved, outwardly convex shape when viewed towards the main surface, and accordingly, the curved shape can increase the edge strength of the short cutting edge, and reduce the contact resistance with the workpiece and accordingly reduce the contact load, and thus can be optimized for high feed rate cutting.

Further, according to an embodiment of the present disclosure, a technical configuration is provided, in which the short cutting edge has a downwardly-inclined shape from the ascending corner cutting edge to the descending corner cutting edge, when viewed towards the short side surface, so that when the high feed cutting insert according to the present disclosure is mounted to the cutting tool, the inclining of the radial rake angle of the high feed cutting insert from the radial straight line to the negative (−) direction which is the cutting direction of the cutting tool can be minimized, thereby reducing the cutting load applied to the high feed cutting insert according to the present disclosure during machining of the bottom surface of the workpiece and also minimizing the occurrence of vibration.

BEST MODE

Hereinafter, preferred embodiments of the present disclosure will be described in detail with reference to the accompanying drawings. However, the description proposed herein is just a preferable example for the purpose of illustrations only and not intended to limit the scope of the disclosure, and accordingly, it should be understood that other equivalents and modifications could be made thereto without departing from the scope of the disclosure.

Figure 1:
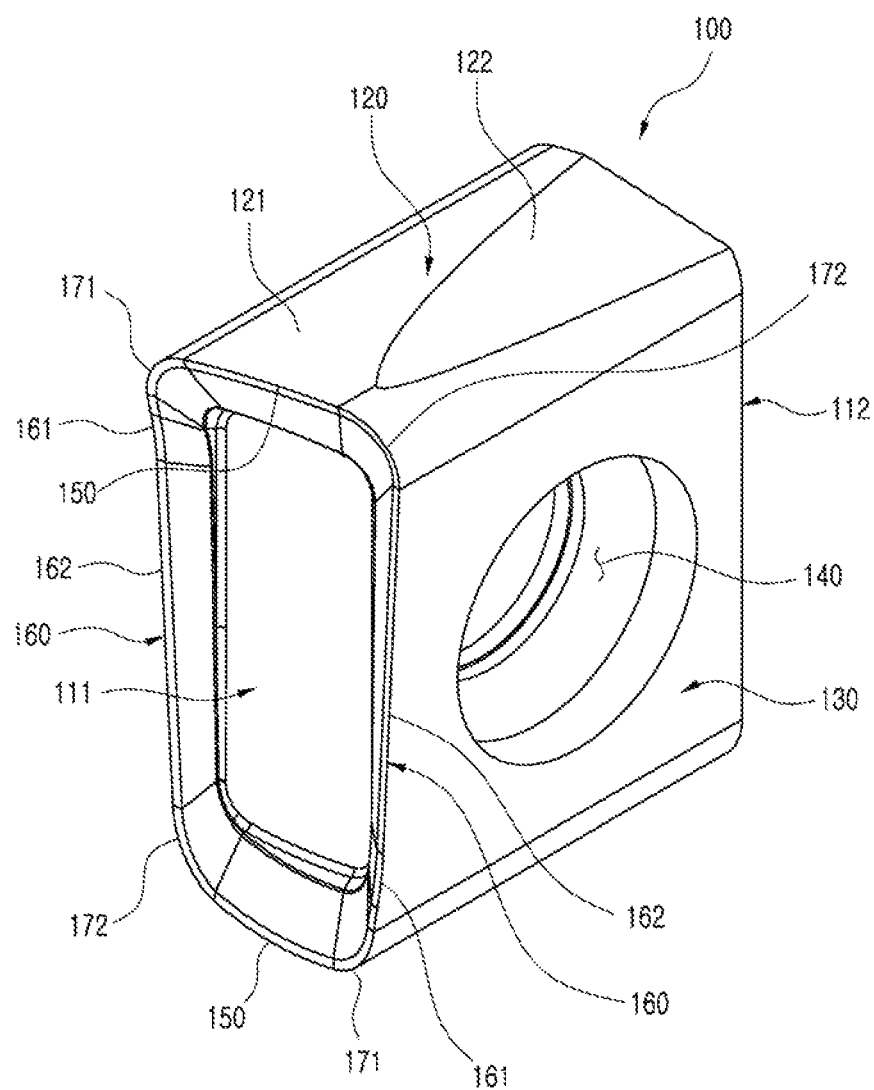
FIG. 1 is a perspective view schematically showing a high feed cutting insert according to a first embodiment of the present disclosure.
Figure 2:
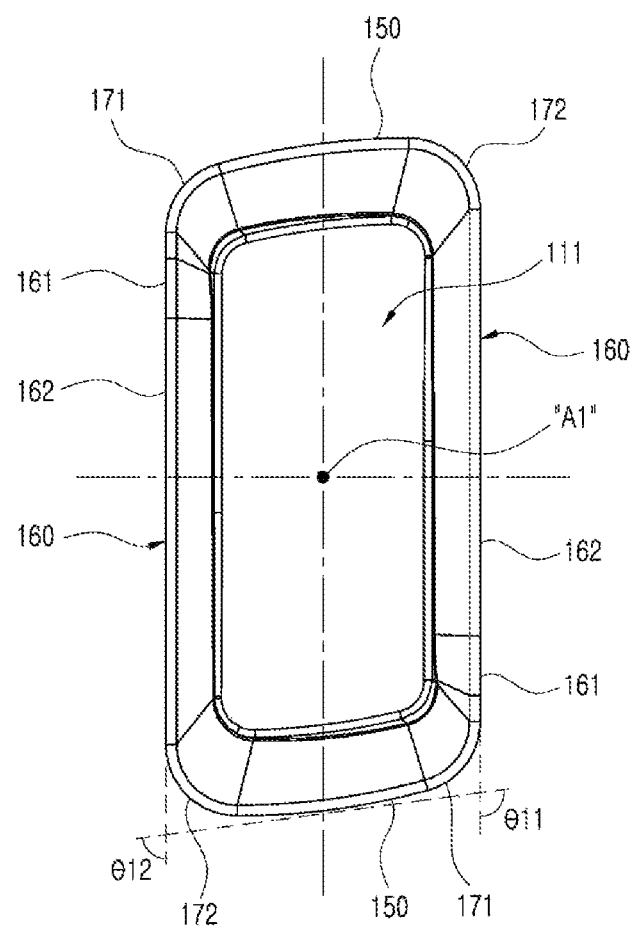
FIG. 2 is a view showing the high feed cutting insert of FIG. 1 when viewed towards the main surface.

FIG. 1 is a perspective view schematically showing a high feed cutting insert according to a first embodiment of the present disclosure, and FIG. 2 is a view showing the high feed cutting insert of FIG. 1 when viewed towards the main surface.

Figure 3:
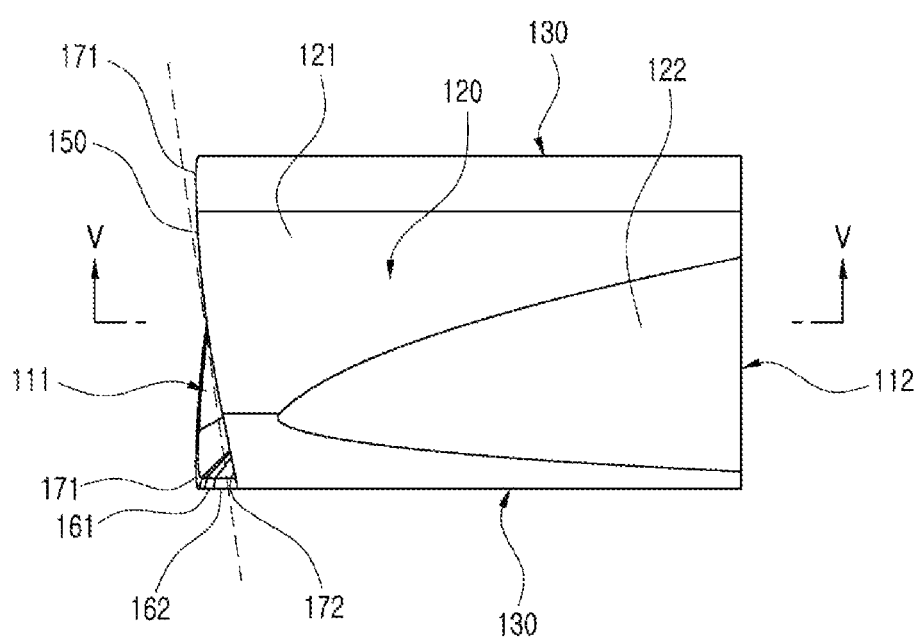
FIG. 3 is a view showing the high feed cutting insert of FIG. 1 when viewed towards the short side surface.
Figure 4:
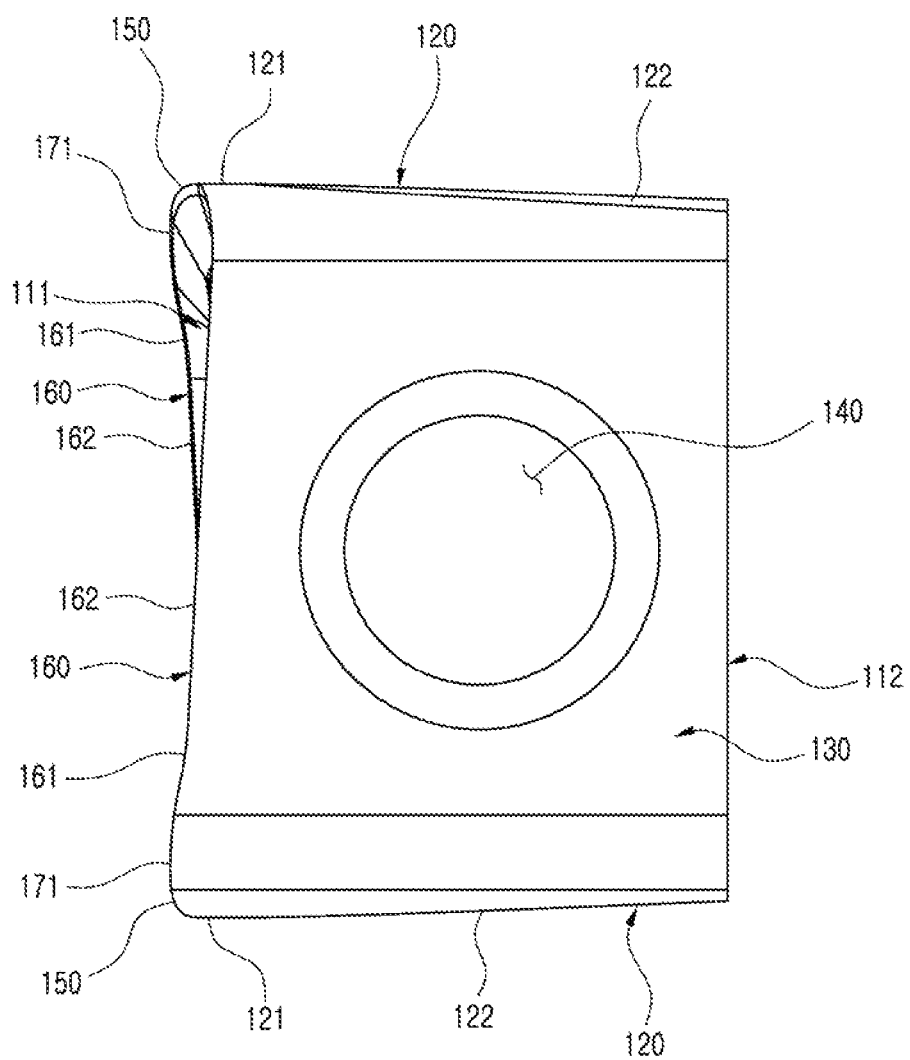
FIG. 4 is a view showing the high feed cutting insert of FIG. 1 when viewed towards the long side surface.
Figure 5:
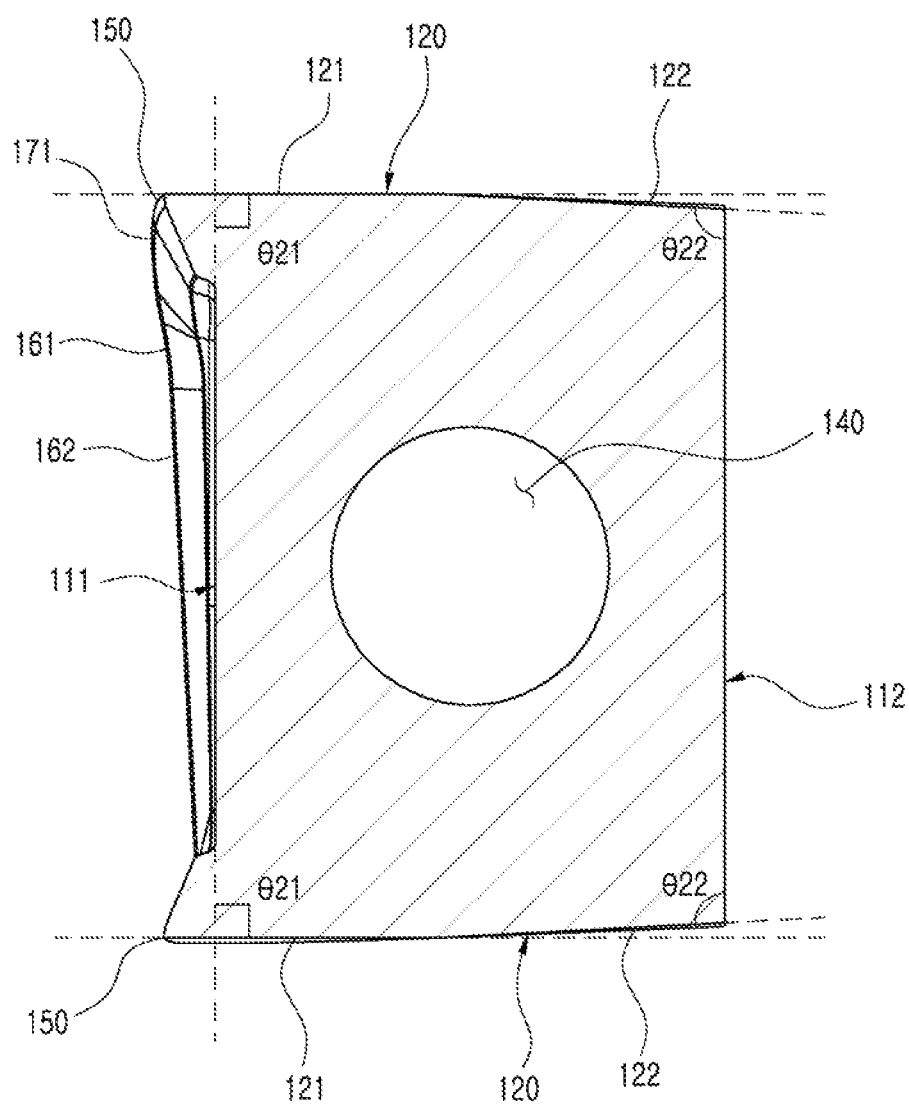
FIG. 5 is a cross-sectional view showing a main part of the high feed cutting insert of FIG. 3 when taken along the line V-V.

FIG. 3 is a view showing the high feed cutting insert of FIG. 1 when viewed towards the short side surface, FIG. 4 is a view showing the high feed cutting insert of FIG. 1 when viewed towards the long side surface, and FIG. 5 is a cross-sectional view showing a main part of the high feed cutting insert of FIG. 3 when taken along the line V-V.

Figure 6:
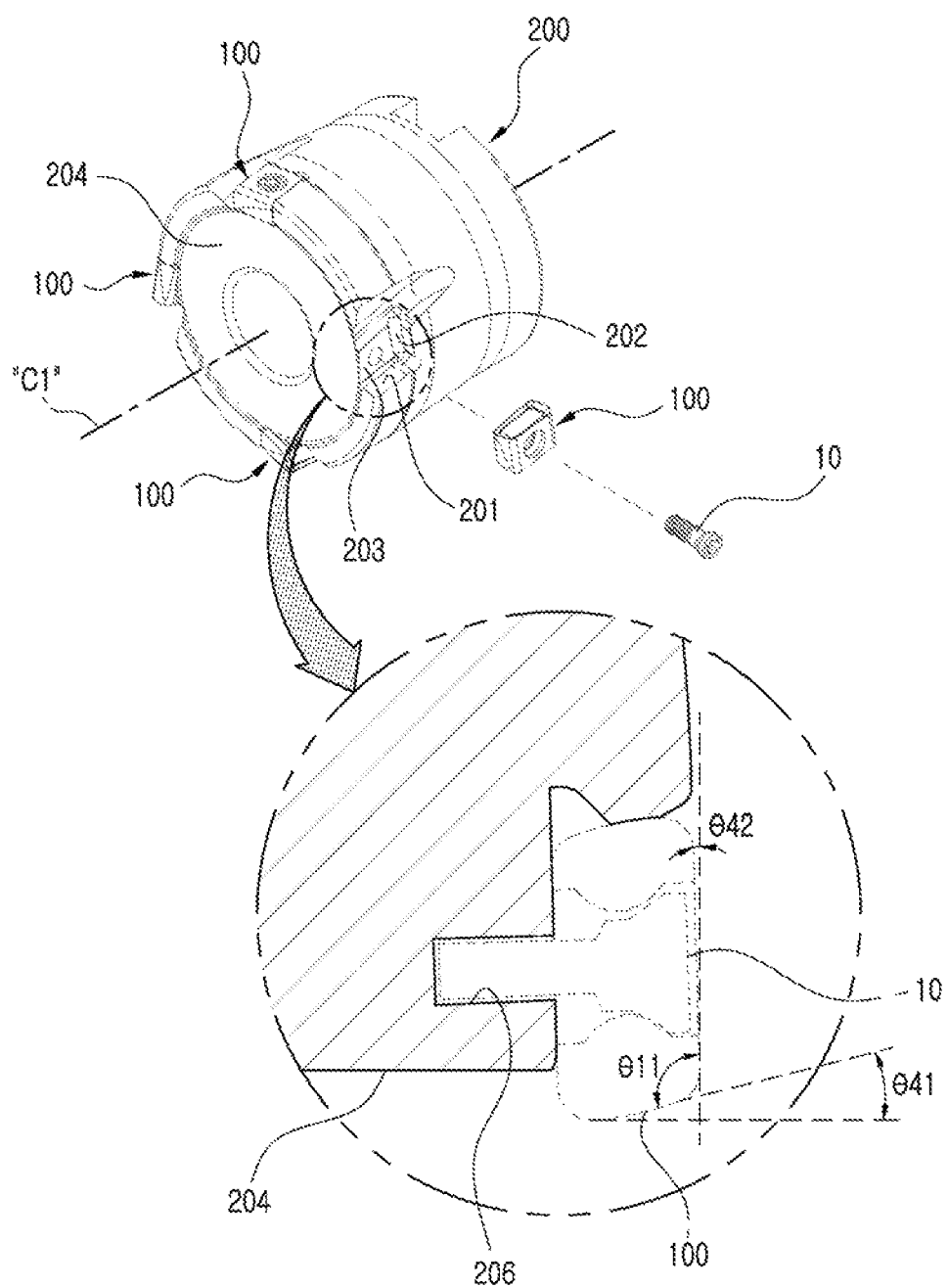
FIG. 6 is a perspective view schematically showing a cutting tool to which the high feed cutting insert of FIG. 1 is mounted.
Figure 7:
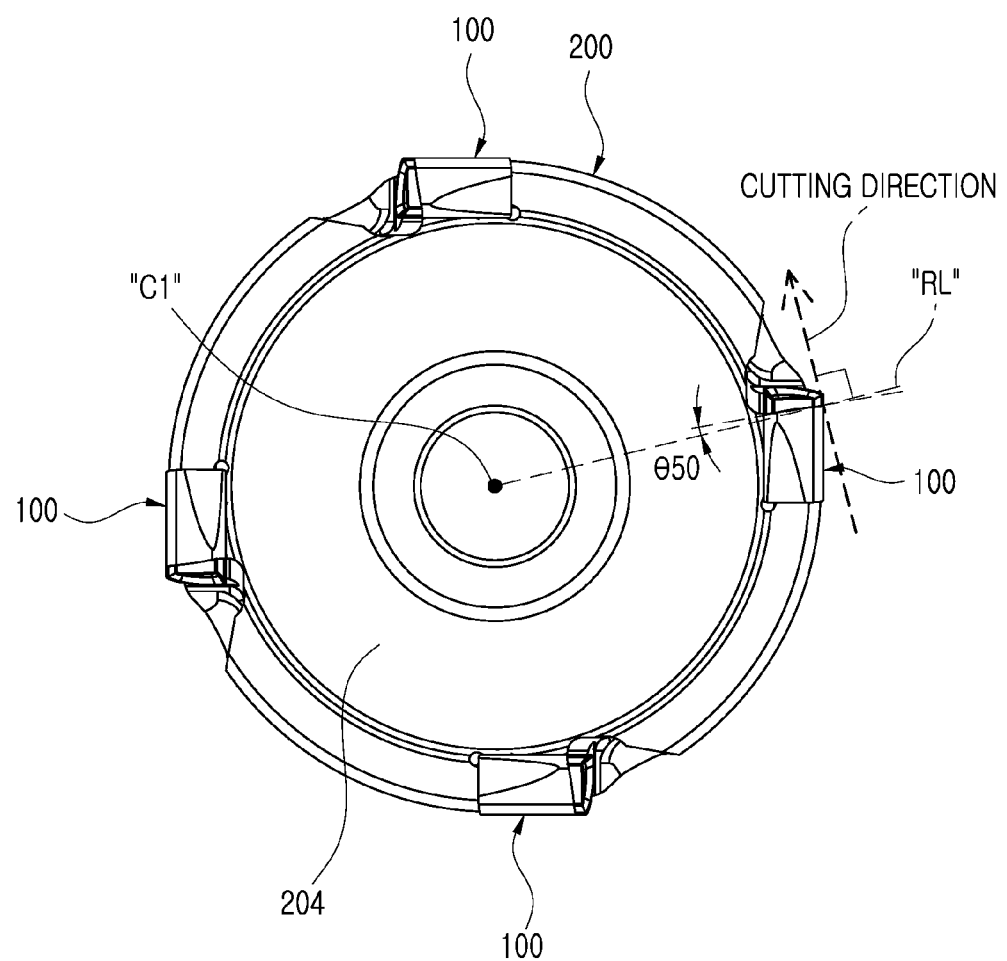
FIG. 7 is a bottom view for showing the radial rake angle of the high feed cutting insert of FIG. 1 when it is mounted to a cutting tool.

FIG. 6 is a perspective view schematically showing a cutting tool to which the high feed cutting insert of FIG. 1 is mounted, FIG. 7 is a bottom view for showing the radial rake angle of the high feed cutting insert of FIG. 1 when it is mounted to a cutting tool.

As shown in FIGS. 1 to 7, a high feed cutting insert 100 according to first embodiment of the present disclosure includes a main surface (upper surface) 111 and a sub-surface (lower surface) 112, two short side surfaces (main side surfaces) 120, two long side surfaces (sub-side surfaces) 130, a fastening hole 140, short cutting edges (main cutting edges) 150, long cutting edges (outer main cutting edges) 160, ascending corner cutting edges 171, and descending corner cutting edges 172. Hereinafter, each of the constituent elements will be described in detail with continued reference to FIGS. 1 to 7.

As shown in FIGS. 1 to 4, the main surface 111 and the sub-surface 112 face each other in opposite directions, the two short side surfaces 120 connect between the main surface 111 and the sub-surface 112 and face each other in opposite directions, the two long side surfaces 130 connect between the main surface 111 and the sub-surface 112 and between the two short side surfaces 120 and face each other in opposite directions and have a greater width than the short side surfaces 120. In addition, as shown in FIGS. 1 and 4, the fastening hole 140 extends through the two long side surfaces 130 such that the cutting tool fastening bolt 10 (see FIG. 6) is inserted therein.

Further, the main surface 111 may be rotationally symmetrical by 180 degrees with respect to a center A1 thereof, as shown in FIG. 2. As shown in FIGS. 3 and 4, the sub-surface 112 has a straight line shape when viewed towards each of the short side surface 120 and the long side surface 130, and thus the sub-surface 112 is formed generally as a flat surface to increase the contact area of the cutting tool (200 in FIG. 6) with the first seat surface 201 and accordingly improve the fastening stability.

As shown in FIGS. 1 to 4, the short cutting edges (main cutting edges) 150 are elements provided on boundary portions between the main surface 111 and the short side surfaces 120 to substantially cut the bottom surface of the workpiece to be brought into contact therewith, the long cutting edges 160 are elements provided on boundary portions between the main surface 111 and the long side surfaces 130 to substantially cut the sidewall of the workpiece to be brought into contact therewith, the ascending corner cutting edges 171 are elements to connect between the short cutting edges 150 and the long cutting edges 160, and are placed in one diagonal position to substantially cut the workpiece to be brought into contact therewith, and the descending corner cutting edges 172 are elements placed in the other diagonal position and at a lower height than the ascending corner cutting edge 171. For reference, the high feed cutting insert 100 according to the first embodiment of the present disclosure described above includes two short cutting edges 150, two long cutting edges 160, two ascending corner cutting edges 171, and two descending corner cutting edges 172.

In particular, as shown in FIG. 2, when viewed towards the main surface 111, the short cutting edges 150 and the long cutting edges 160 form an obtuse angle θ11 while the ascending corner cutting edges 171 are interposed therebetween and form an acute angle θ12 while the descending corner cutting edges are interposed therebetween. That is, as shown in FIG. 2, when viewed towards the main surface 111, the two short cutting edges 150 and the two long cutting edges 160 may be arranged in a substantially parallelogram shape. Therefore, as shown in FIG. 6, the cutting insert 100 is not required to be inclined at excessive angles with respect to the cutting tool 200 in order to provide the entering angle θ41 and the back taper θ42 when mounted to the cutting tool 200, since the obtuse angle θ11 can provide an entering angle θ41 of approximately 5 to 15 degrees, thereby providing a sufficient entering angle θ41 while ensuring the rigidity of the bottom part 204 of the cutting tool 200. In other words, since a screw fastening hole 206 formed in the cutting tool 200 can be formed at a sufficient distance from the bottom surface 204 of the cutting tool 200, while a sufficient entering angle $\theta 41$ can still be provided, it is possible to ensure the rigidity of the bottom part of the cutting tool 200.

Furthermore, when the high feed cutting insert 100 according to the first embodiment of the present disclosure is used for a right-hand type cutting tool (see 200 in FIG. 6) that rotates to the right (clockwise when viewed downward from the top of the cutting tool) to perform the machining, for example, with the high feed cutting insert 100 according to the first embodiment of the present disclosure, it is possible to use two corners corresponding to the two ascending corner cutting edges 171 alternately.

Hereinafter, the short cutting edge 150 will be described in more detail with reference to FIGS. 1 to 4 and 7 again.

The short cutting edges 150 have a curved, outwardly convex shape when viewed towards the main surface 111, as shown in FIG. 2. Therefore, the curved convex shape can allow increased edge strength of the short cutting edges 150, and reduced contact resistance with the workpiece and accordingly reduced cutting load, which can ultimately enable the high feed cutting insert 100 according to the present disclosure having the short cutting edges 150 in the shape described above to be used for high feed machining.

In addition, as shown in FIG. 3, the short cutting edges 150 may have a downwardly-inclined shape from the ascending corner cutting edges 171 towards the descending corner cutting edges 172, when viewed towards the short side surfaces 120. Therefore, as shown in FIG. 7, unlike the prior art, when the high feed cutting insert 100 according to the present disclosure is mounted to the cutting tool 200, the inclining of the radial rake angle $\theta 50$ of the high feed cutting insert 100 from the radial straight line RL to the negative (−) direction which is the cutting direction of the cutting tool 200 can be minimized, thereby reducing the cutting load applied to the high feed cutting insert 100 according to the present disclosure during machining of the bottom surface of the workpiece and also minimizing the occurrence of vibration.

In addition, the short cutting edges 150 may likewise have the curved, outwardly convex shape, when viewed towards the short side surface 120, as shown in FIG. 3. Accordingly, when considering this in combination with the short cutting edges 150 that has the curved, outwardly convex shape when viewed towards the main surface 111, the short cutting edges 150 may have a substantially helix cutting edge structure, thereby further increasing the edge strength of the short cutting edges 150 and further reducing the cutting load of the short cutting edges 150.

Hereinafter, the long cutting edge 160 will be described in more detail with reference to FIGS. 1 to 4 again.

As shown in FIGS. 1 and 4, the long cutting edge 160 may include a concave section 161 (first outer main cutting edge), which is inwardly concaved when viewed towards the long side surface 130, and a straight section 162 (second outer main cutting edge) which connects the concave section 161. Thus, the edge strength of the long cutting edge 160 can be enhanced through the concave section 161, and the cutting load of the long cutting edge 160 can be reduced through the inclined shape of the concave section 161, resulting in reduced cutting resistance with the workpiece during a pocket cutting for machining grooves and the like.

Furthermore, as shown in FIG. 4, when viewed towards the long side surface 130, the concave section 161 may start at the ascending corner cutting edge 171 and end at the straight line section 162, and the straight section 162 may start at the concave section 161 and end at the descending corner cutting edge 172, and have a downwardly-inclined shape towards the descending corner 172. Therefore, the cutting load of the long cutting edge 160 can be further reduced through the inclined shape of the concave section 161 and the inclined shape of the straight section 162, resulting in further reduced cutting resistance with the workpiece during a pocket cutting for machining grooves and the like. In addition, although not shown, when the cutting insert 100 according to the present disclosure is mounted to the cutting tool (see 200 in FIG. 6), the cutting insert 100 according to the present disclosure may be realized in a form positively inclined with respect to the axis (see C1 in FIG. 6) of the cutting tool (see 200 in FIG. 6) through the concave section 161 having the inclined shape and the straight section 162, and accordingly, it is possible to prevent the interferences with the side wall of the workpiece during the step machining and also reduce the cutting resistance when the cutting insert contacts with the workpiece.

Hereinafter, the ascending corner cutting edge 171 and the descending corner cutting edge 172 will be described in detail with reference to FIG. 4 again.

As shown in FIG. 4, when viewed towards the long side surface 130, the ascending corner cutting edge 171 may have an outwardly convex shape, and the descending corner cutting edge 172 may have an inwardly concave shape. Thus, the ascending corner may extend continuously with the concave section, and the descending corner cutting edge may extend continuously with the straight line section that has the downwardly-inclined shape.

Hereinafter, the short side surface 120 will be described in more detail with reference to FIGS. 1, 3 and 5 again.

The short side surface 120 may include a first clearance surface 121 adjacent to the main surface 111 and a second clearance surface 122, as shown in FIGS. 1, 3 and 5. In this example, the first clearance surface 121 is adjacent to the main surface 111 and may form a right angle $\theta 21$ with respect to the main surface 111, and the second clearance surface 122 may connect the first clearance surface 121 and the sub-surface 112 and form an obtuse angle $\theta 22$ with respect to the sub-surface 112, and have a generally planar shape. Accordingly, upon fastening with the cutting tool (see 200 in FIG. 6) through the second clearance surface 122, the contact area of the cutting tool (see 200 in FIG. 6) with the second seat surface (see 202 in FIG. 6) may be increased and at the same time, the second clearance surface 122 may be fastened to the second seat surface 202 in the form of a wedge, so that the fastening stability with respect to the cutting tool (see 200 in FIG. 6) may be improved.

Hereinafter, the cutting tool 200 according to the first embodiment of the present disclosure will be described in detail with reference to FIG. 6.

The cutting tool 200 according to the first embodiment of the present disclosure is a type of cutting tool to which the high feed cutting insert 100 according to the first embodiment of the present disclosure described above is mounted, and it includes a first seat surface 201, a second seat surface 202, and a third seat surface 203, which are provided in a pocket portion thereof.

The first seat surface 201 is where the sub-surface 112 of the high feed cutting insert 100 described above is placed, the second seat surface 202 is where the short side surface 120 of the high feed cutting insert 100 described above is placed, and the third seat surface 203 is where the long side surface 130 of the high feed cutting insert 100 described above is placed.

In particular, the third seat surface 203 may be inclined in a direction further away from the center C1 of the cutting tool 200 as closer towards the bottom surface 204 of the cutting tool 200. Therefore, when the high feed cutting insert 100 according to the first embodiment of the present disclosure is mounted to the third seat surface 203 of the cutting tool according to the present disclosure, a back taper θ42 is formed, thereby reducing the interference with the workpiece during the pocket machining.

Hereinafter, a high feed cutting insert 2100 according to a second embodiment of the present disclosure will be described in detail with reference to FIGS. 8 to 10.

Figure 8:
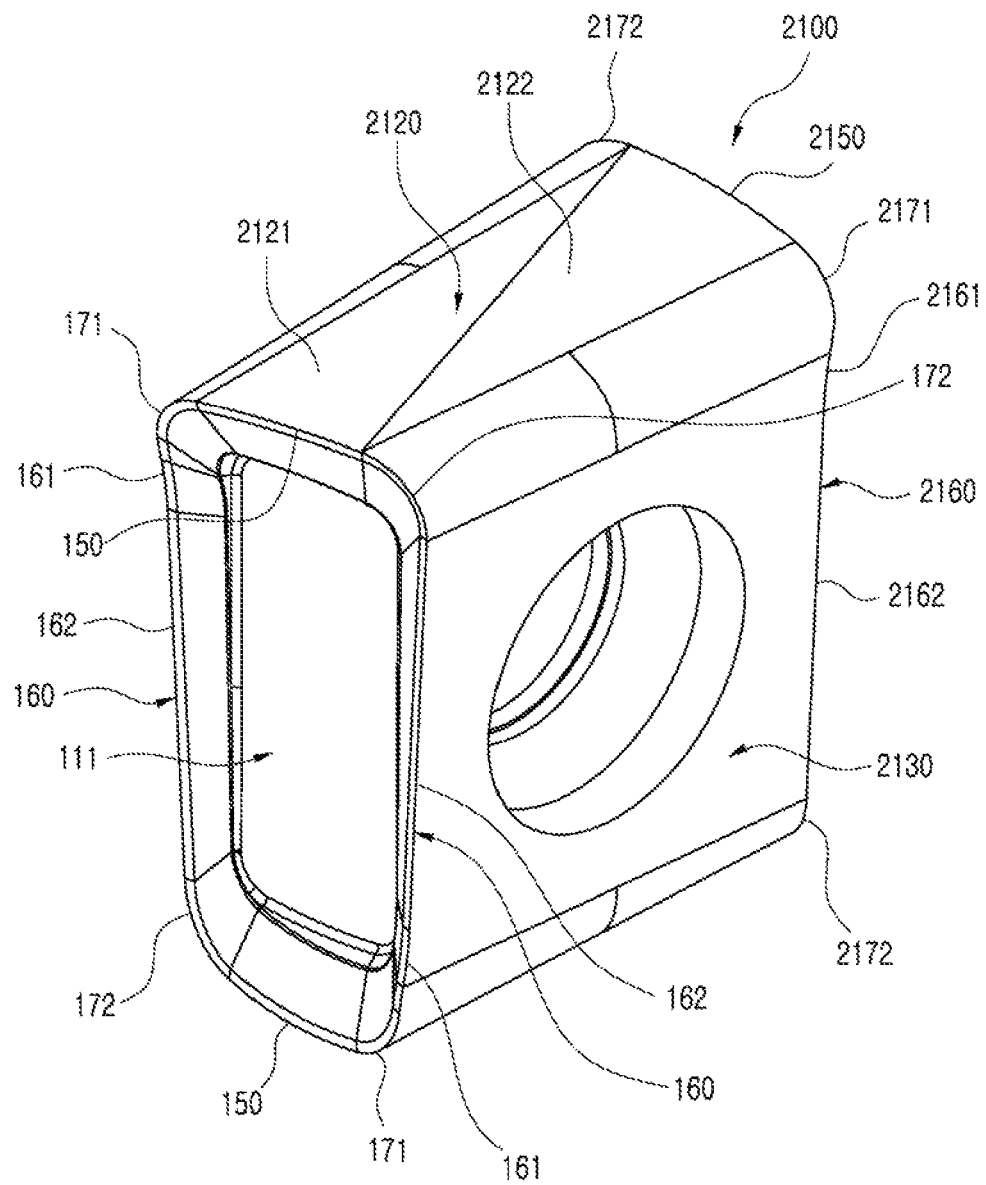
FIG. 8 is a cross-sectional view of a main part, which schematically shows a high feed cutting insert according to a second embodiment of the present disclosure.
Figure 9:
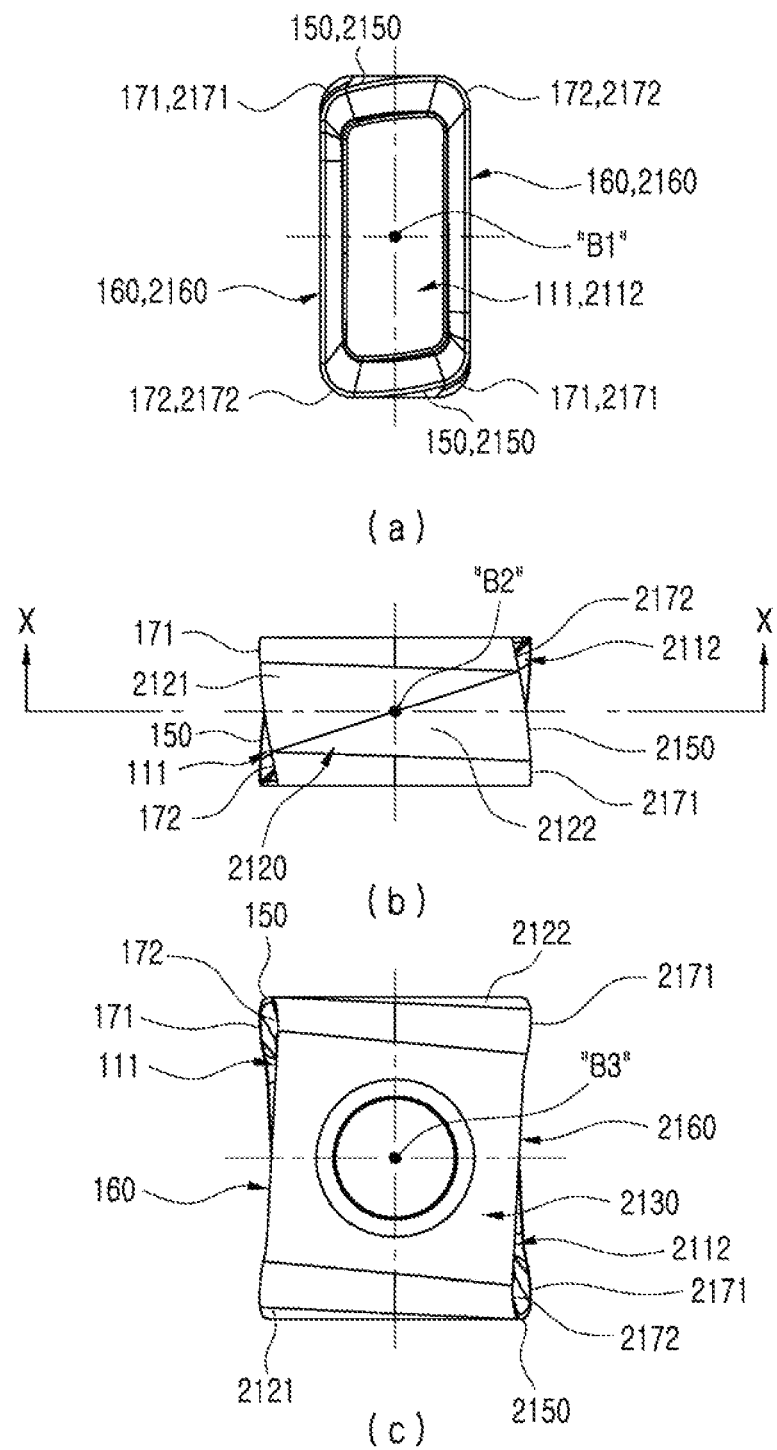
FIG. 9 is a view schematically showing the high feed cutting insert of FIG. 8 when viewed from the directions of the main surface and the sub-surface (a), when viewed from the direction of the short side surface (b), and when viewed from the direction of the long side surface (c).
Figure 10:
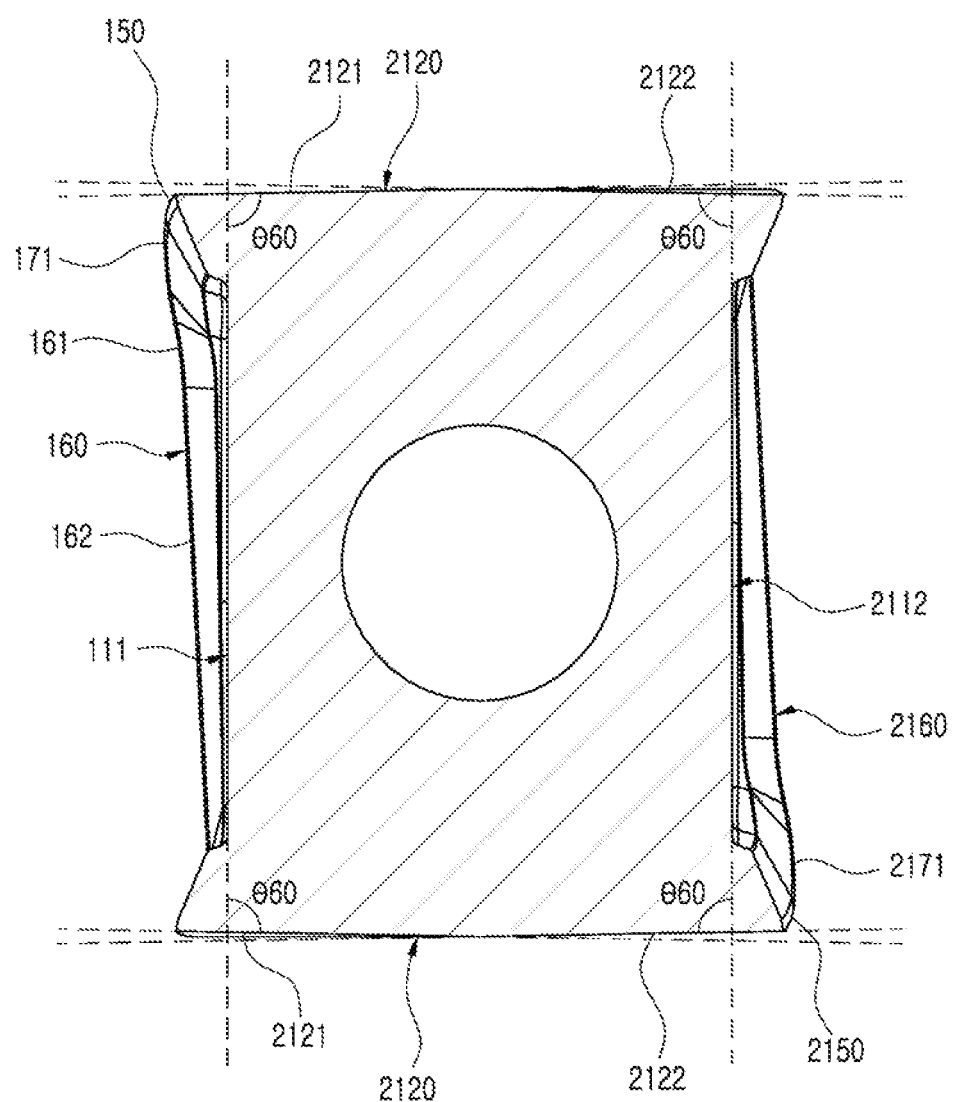
FIG. 10 is a cross-sectional view showing a main part of the high feed cutting insert of FIG. 9B taken along the line X-X.

FIG. 8 is a cross-sectional view of a main part schematically showing the high feed cutting insert according to the second embodiment of the present disclosure, FIG. 9 is a view schematically showing the high feed cutting insert of FIG. 8 when viewed from the directions of the main surface and the sub-surface (FIG. 9A), when viewed from the direction of the short side surface (FIG. 9B), and when viewed from the direction of the long side surface (FIG. 9C), and FIG. 10 is a cross-sectional view showing a main part of the high feed cutting insert of FIG. 9B taken along the line X-X.

As shown in FIGS. 8 to 10, the high feed cutting insert 2100 according to the second embodiment of the present disclosure is almost the same as the first embodiment of the present disclosure described above, except for the changes in the shapes of a sub-surface 2112, a short side surface 2120, and a long side surface 2130, which will be mainly described below.

As illustrated in FIG. 9A, the sub-surface 2112 may have the same shape as the main surface 111 according to the first embodiment of the present disclosure described above. In particular, as shown in FIGS. 8 and 9, each of the main surface 111 and the sub-surface 2112 may be rotationally symmetrical by 180 degrees with respect to a center B1 thereof, and respective short side surfaces 2120 may be rotationally symmetrical by 180 degrees with respect to a center B2 thereof, and respective long side surfaces 2130 may be rotationally symmetrical by 180 degrees with respect to a center B3 thereof. In addition, as shown in FIGS. 8 and 10, the short side surface 2120 may include a first clearance surface 2121 forming an obtuse angle θ60 with the main surface 111 for wedge engagement with the cutting tool (see 200 in FIG. 6) when the sub-surface 2112 is used, and a second clearance surface 2122 forming an obtuse angle θ60 with the sub-surface 2112 for the wedge engagement with the cutting tool when the main surface 111 is used.

Note that a short cutting edge 2150, a long cutting edge 2160, an ascending corner cutting edge 2171 and a descending corner cutting edge 2172 provided on the sub-surface 2112 side have the same shape as the short cutting edge 150, the long cutting edge 160, the ascending corner cutting edge 171, and the descending corner cutting edge 172 provided on the main surface 111 side according to the first embodiment of the present disclosure described above, and accordingly, detailed description thereof will be omitted.

Therefore, when the high feed cutting insert 2100 according to the second embodiment of the present disclosure is used for a right-hand type cutting tool (see 200 in FIG. 6) that rotates to the right (clockwise when viewed downward from the top of the cutting tool) to perform the machining, for example, with the high feed cutting insert 2100 according to the present disclosure, it is possible to use the four corners corresponding to the two ascending corner cutting edges 171 of the main surface 111 and the two ascending corner cutting edges 2171 of the sub-surface 2112 alternately.

Hereinafter, a high feed cutting insert 3100 according to a third embodiment of the present disclosure will be described in detail with reference to FIGS. 11 to 13.

Figure 11:
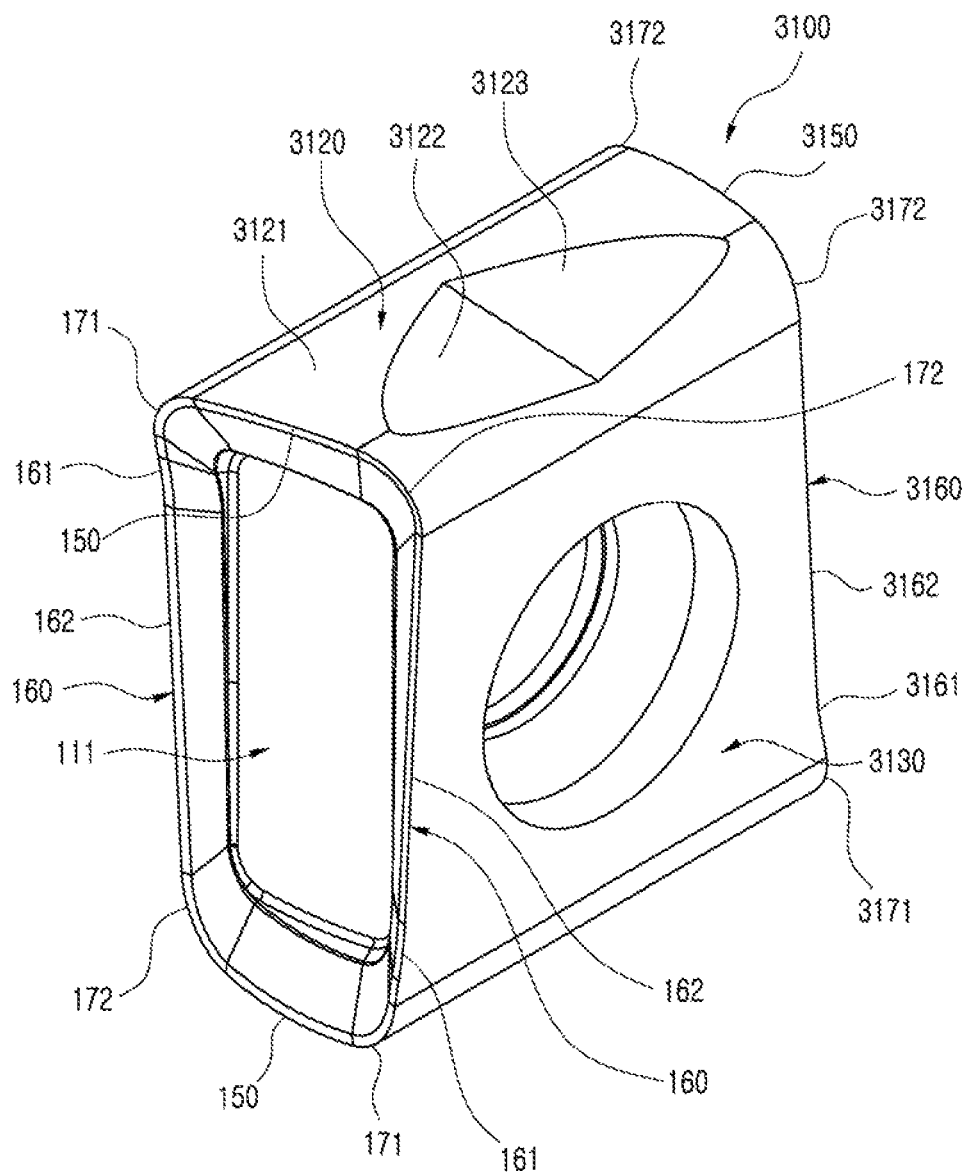
FIG. 11 is a perspective view schematically showing a high feed cutting insert according to a third embodiment of the present disclosure.
Figure 12:
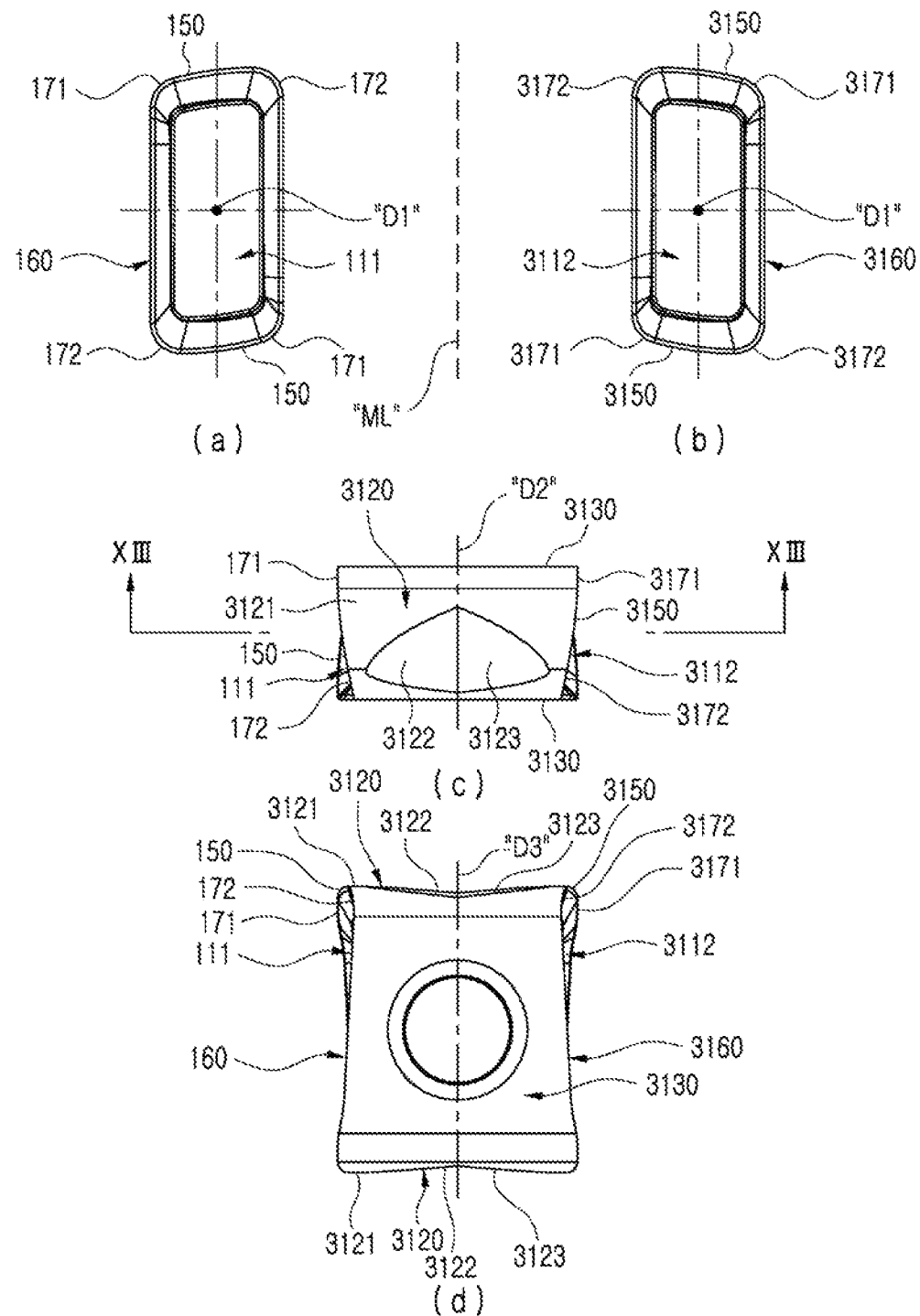
FIG. 12 is a view schematically showing the high feed cutting insert of FIG. 11 when viewed from the direction of the main surface (a), when viewed from the direction of the sub-surface (b), when viewed from the direction of the short side surface (c), and when viewed from the direction of the long side surface (d).
Figure 13:
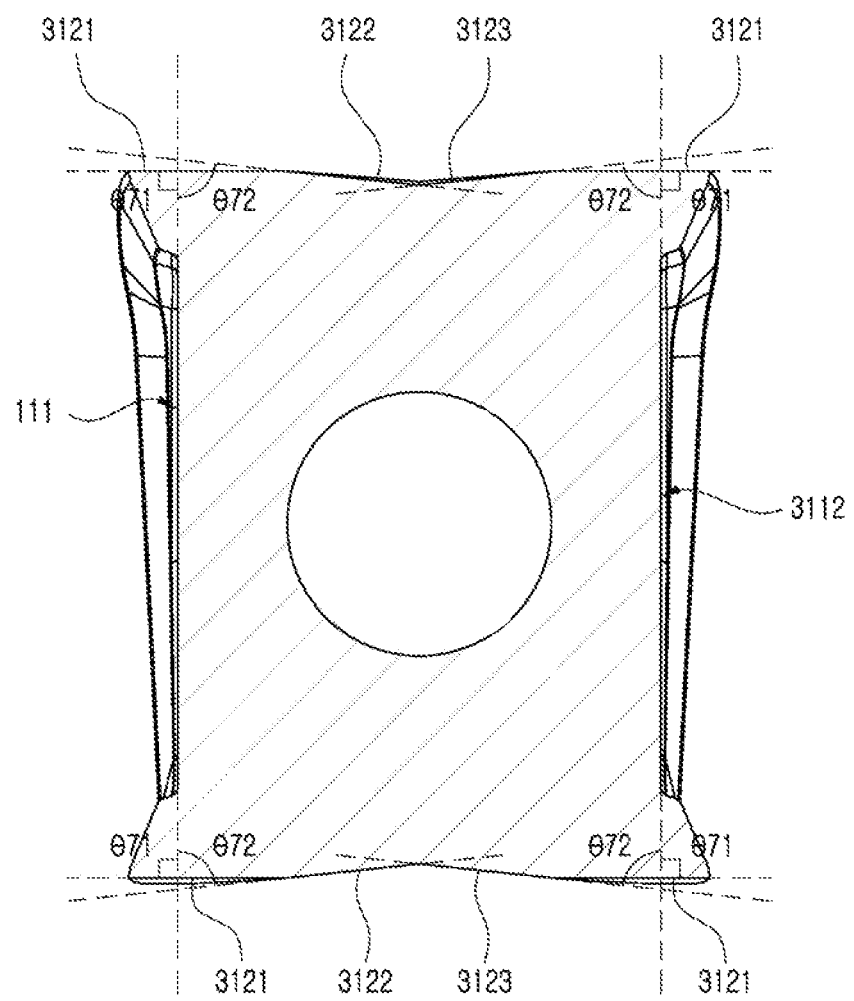
FIG. 13 is a cross-sectional view showing a main part of the high feed cutting insert of FIG. 12C taken along line XIII-XIII.
Figure 14:
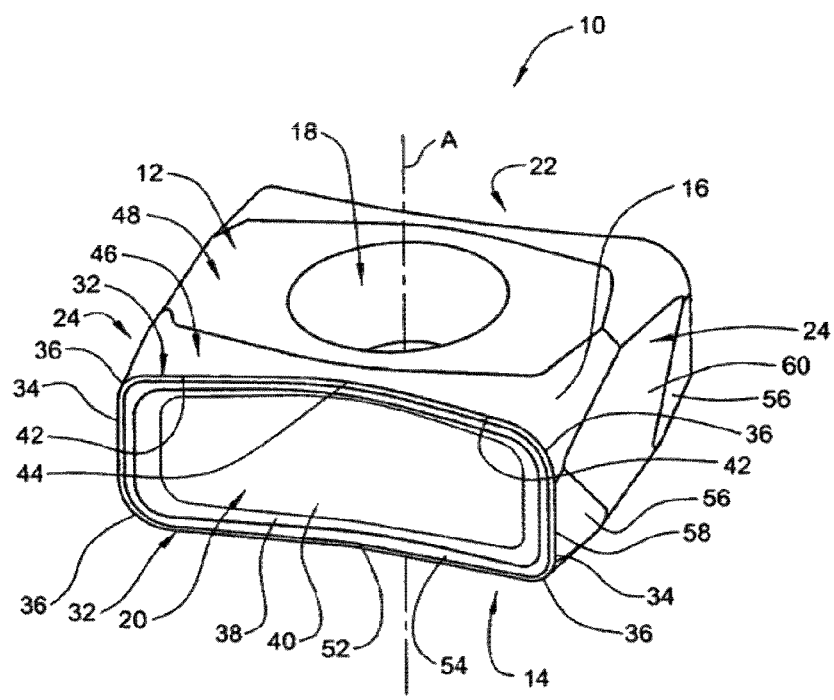
FIG. 14 is a perspective view showing a conventional tangential cutting insert.
Figure 15:
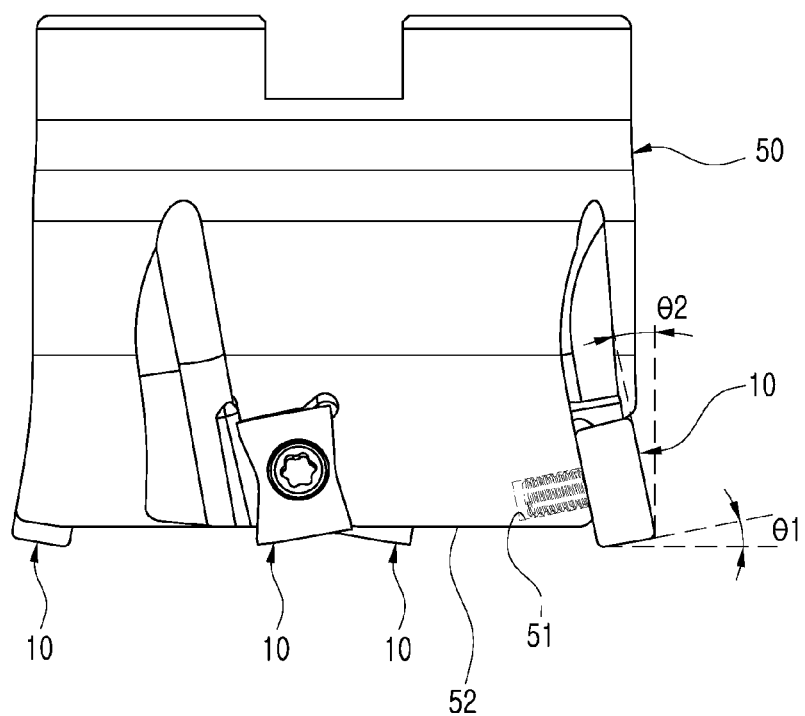
FIG. 15 is a view for showing the entering angle and the back taper of the cutting insert of FIG. 14 when mounted to the cutting tool.
Figure 16:
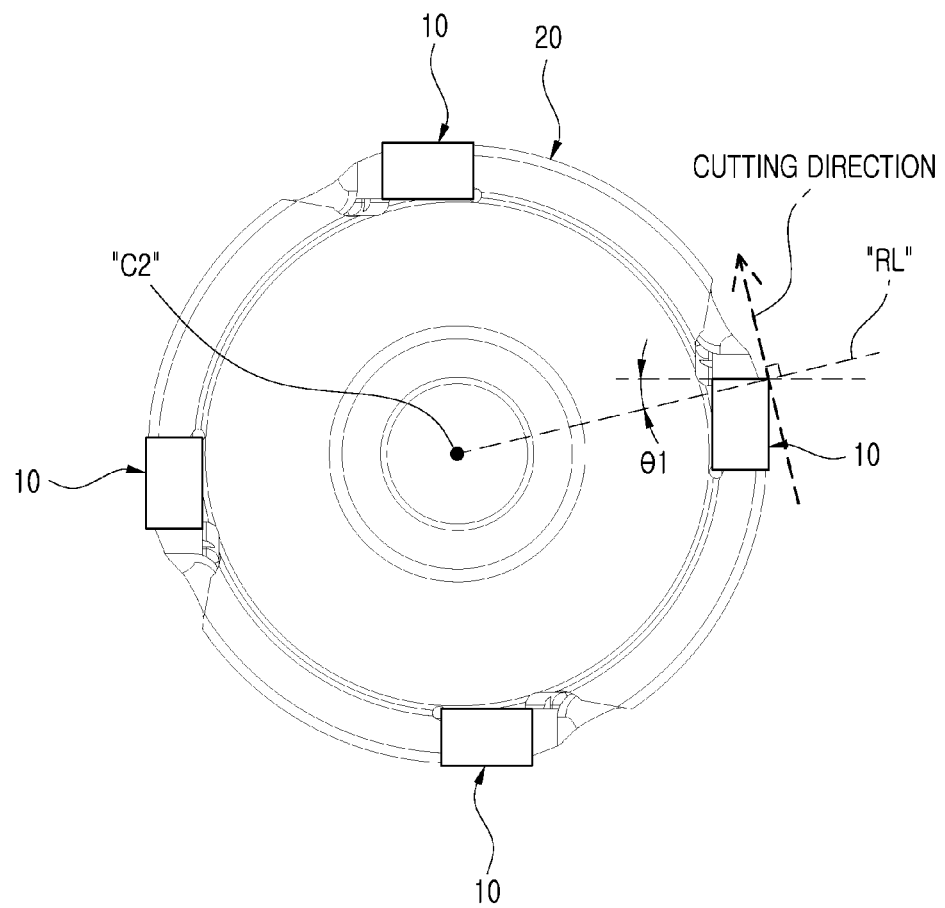
FIG. 16 is a bottom view for showing the radial rake angle of the cutting insert of FIG. 14 when mounted to the cutting tool.

FIG. 11 is a perspective view schematically showing the high feed cutting insert according to the third embodiment of the present disclosure, FIG. 12 is a view schematically showing the high feed cutting insert of FIG. 11 when viewed from the direction of the main surface (FIG. 11A), when viewed from the direction of the short side surface (FIG. 11B), and when viewed from the direction of the long side surface (FIG. 11C), and FIG. 13 is a cross-sectional view showing a main part of the high feed cutting insert of FIG. 12C taken along line XIII-XIII.

As shown in FIGS. 11 to 13, the high feed cutting insert 3100 according to the third embodiment of the present disclosure is almost the same as the first embodiment of the present disclosure described above, except for the changes in the shapes of a sub-surface 3112, a short side surface 3120, and a long side surface 3130, which will be mainly described below.

As shown in FIG. 12B, the sub-surface 3112 may have a laterally symmetrical shape with the main surface 111 according to the first embodiment of the present disclosure described above, with respect to an imaginary line ML interposed therebetween. In particular, as shown in FIGS. 11 and 12, each of the main surface 111 and the sub-surface 3112 may be rotationally symmetrical by 180 degrees with respect to a center D1 thereof, and respective short side surfaces 3120 may be laterally symmetrical with respect to a center line D2 that runs across the long side surfaces 3130 on upper and lower sides, and respective long side surfaces 3130 may be laterally symmetrical with respect to a center line D3 that runs across the short side surfaces 3120 on upper and lower sides. In addition, as shown in FIG. 13, the short side surface 3120 includes a first clearance surface 3121 forming a right angle θ71 with the main surface 111 and the sub-surface 3112, a second clearance surface 3122 forming an obtuse angle θ72 with the main surface 111 for wedge engagement with the cutting tool (see 200 in FIG. 6) when the main surface 111 is used, and a third clearance surface 3123 forming an obtuse angle θ72 with the sub-surface 3112 for wedge engagement with the cutting tool when the sub-surface 3112 is used.

Note that a short cutting edge 3150, a long cutting edge 3160, an ascending corner cutting edge 3171 and a descending corner cutting edge 3172 provided on the sub-surface 3112 side have the same shape as the short cutting edge 150, the long cutting edge 160, the ascending corner cutting edge 171, and the descending corner cutting edge 172 provided on the main surface 111 side according to the first embodiment of the present disclosure described above, and accordingly, detailed description thereof will be omitted.

Therefore, when the high feed cutting insert 3100 according to the third embodiment of the present disclosure is used for the right-hand type cutting tool (see 200 in FIG. 6) that rotates to the right (clockwise when viewed downward from the top of the cutting tool) to perform the machining, for example, with the high feed cutting insert 3100 according to the present disclosure, it is possible to use the two corners corresponding to the two ascending corner cutting edges 171 of the main surface 111 alternately, and when used for a left-hand type cutting tool (not shown) that rotates to the right (counterclockwise when viewed downward from the upper end of the cutting tool) to perform the machining, for example, with the high feed cutting insert 3100 according to the present disclosure, it is possible to use the two corners corresponding to the two ascending corner cutting edges 3171 of the sub-surface 3112 alternately.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a high feed cutting insert having a high machining speed and a cutting tool equipped with the same, which are industrially applicable.

What is claimed is:

1. A high feed cutting insert comprising:
a main surface and a sub-surface facing each other in opposite directions; two short side surfaces connecting the main surface and the sub-surface and facing each other in opposite directions; two long side surfaces connecting the main surface and the sub-surface, connecting the two short side surfaces, facing each other in opposite directions, and having a greater width than that of the short side surfaces; and a fastening hole extending through the two long side surfaces, through which a cutting tool fastening bolt is inserted, wherein the high feed cutting insert comprises:
short cutting edges provided on boundary portions between the main surface and the short side surfaces;
long cutting edges provided on boundary portions between the main surface and the long side surfaces;
first two corner cutting edges connecting the short cutting edges and the long cutting edges, and each thereof placed diagonally to each other; and
second two corner cutting edges, each thereof placed diagonally to each other and having a lower height than the first two corner cutting edges,
wherein the short cutting edges and the long cutting edges,
when viewed towards the main surface,
form an obtuse angle while the first corner cutting edges are interposed therebetween and,
form an acute angle while the second corner cutting edges are interposed therebetween,
wherein, when viewed towards the long side surfaces, the long cutting edges include
concave sections that are inwardly concave; and
straight line section connecting the concave sections.

2. The high feed cutting insert according to claim 1, wherein the short cutting edges have a curved, outwardly convex shape when viewed towards the main surface.

3. The high feed cutting insert according to claim 1, wherein the short cutting edges have a downwardly-inclined shape from the first corner cutting edges to the second corner cutting edges, when viewed towards the short side surfaces.

4. The high feed cutting insert according to claim 3, wherein the short cutting edges have a curved, outwardly convex shape when viewed towards the short side surfaces.

5. The high feed cutting insert according to claim 1, wherein, when viewed towards the long side surfaces,
the concave sections start at the first corner cutting edges and end at the straight line sections, and
the straight sections start at the concave sections and end at the second corner cutting edges and have a downwardly-inclined shape towards the second corner cutting edges.

6. The high feed cutting insert according to claim 5, wherein, when viewed towards the long side surfaces,
the first corner cutting edges have an outwardly convex shape, and
the second corner cutting edges have an inwardly concave shape.

7. The high feed cutting insert according to claim 1, wherein the short side surfaces include
first clearance surfaces adjacent to the short cutting edges; and
second clearance surfaces connecting the first clearance surfaces and the sub-surface,
wherein the first clearance surfaces form a right angle with respect to the main surface, and
the second clearance surfaces form an obtuse angle with respect to the sub-surface and has a generally planar shape.

8. The high feed cutting insert according to claim 7, wherein, when viewed from the short lateral surfaces,
a portion of the first clearance surfaces adjacent to the first corner cutting edges is connected to the sub-surface.

9. The high feed cutting insert according to claim 1, wherein the sub-surface has a straight line shape when viewed towards each of the short side surfaces and the long side surfaces.

10. The high feed cutting insert according to claim 1, wherein the main surface is rotationally symmetrical by 180 degrees with respect to a center thereof.

11. The high feed cutting insert according to claim 1, wherein the main surface and the sub-surface have the same shape as each other,
each of the main surface and the sub-surface is rotationally symmetrical by 180 degrees with respect to a center thereof,
each of the short side surfaces is rotationally symmetrical by 180 degrees with respect to a center thereof, and
each of the long side surfaces is rotationally symmetrical by 180 degrees with respect to a center thereof.

12. The high feed cutting insert according to claim 1, wherein
each of the main surface and the sub-surface is rotationally symmetrical by 180 degrees with respect to a center thereof,
each of the short side surfaces is laterally symmetrical with respect to a center line that runs across the long side surfaces, and
each of the long side surfaces is laterally symmetrical with respect to a center line that runs across the short side surfaces.

13. A cutting tool equipped with the high feed cutting insert according to claim 1, comprising:
a first seat surface on which the sub-surface is placed;
a second seat surface on which the short side surfaces are placed; and
a third seat surface on which the long side surfaces are placed,
wherein the third seat surface is inclined in a direction further away from a center of the cutting tool towards a bottom of the cutting tool.

* * * * *